(12) United States Patent
Kotake

(10) Patent No.: US 10,976,972 B2
(45) Date of Patent: *Apr. 13, 2021

(54) SYSTEM INCLUDING INFORMATION PROCESSING DEVICE, AND MULTIPLE DEVICES CONNECTED TO INFORMATION PROCESSING DEVICE VIA A NETWORK, AND INFORMATION PROCESSING DEVICE AND NON-TRANSITORY COMPUTER-READABLE RECORDING MEDIUM FOR SETTING CONNECTION DESTINATION OF INFORMATION PROCESSING DEVICE

(71) Applicant: BROTHER KOGYO KABUSHIKI KAISHA, Nagoya (JP)

(72) Inventor: Kanako Kotake, Toyokawa (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/734,522

(22) Filed: Jan. 6, 2020

(65) Prior Publication Data

US 2020/0142652 A1 May 7, 2020

Related U.S. Application Data

(63) Continuation of application No. 16/257,117, filed on Jan. 25, 2019, now Pat. No. 10,558,409.

(30) Foreign Application Priority Data

Jan. 31, 2018 (JP) .............................. JP2018-015812

(51) Int. Cl.
*G06F 3/12* (2006.01)
*H04N 1/00* (2006.01)

(52) U.S. Cl.
CPC .......... *G06F 3/1236* (2013.01); *G06F 3/1232* (2013.01); *G06F 3/1287* (2013.01);
(Continued)

(58) Field of Classification Search
None
See application file for complete search history.

(56) References Cited

U.S. PATENT DOCUMENTS

2013/0070297 A1* 3/2013 Kato ................. H04N 1/00217
358/1.15
2018/0067700 A1* 3/2018 Araki .................... G06F 3/1204

FOREIGN PATENT DOCUMENTS

JP       2014-167719 A  ‡  9/2014
JP       2014-167719 A     9/2014

OTHER PUBLICATIONS

Notice of Allowance dated Oct. 17, 2019 from parent U.S. Appl. No. 16/257,117.

* cited by examiner
‡ imported from a related application

*Primary Examiner* — Andrew H Lam
(74) *Attorney, Agent, or Firm* — Scully, Scott, Murphy & Presser, PC

(57) ABSTRACT

A non-transitory computer-readable recording medium storing computer-readable instructions for an information processing device including a memory and a processor is provided. The memory stores connection destination setting data initially indicating a first connection destination corresponding to a first first-type image forming device as a set connection destination of a first device driver which supports first-type image forming devices. The computer-readable instructions cause, when executed by the processor, the information processing device to determine whether the first first-type image forming device corresponding to the first (Continued)

connection destination is online or offline, identify, in response to determining that the first first-type image forming device is offline, a second connection destination that is different from the first connection destination and corresponding to a second first-type image forming device which is online, and update the connection destination setting data to indicate the identified second connection destination as the set connection destination.

25 Claims, 8 Drawing Sheets

(52) U.S. Cl.
 CPC . *H04N 1/00408* (2013.01); *H04N 2201/0036* (2013.01); *H04N 2201/0039* (2013.01); *H04N 2201/0094* (2013.01)

| MODEL NAME | PORT NAME | MAIN/SUB | IP ADDRESS |
|---|---|---|---|
| MFP-A | PORT 1 | MAIN | 192.168.0.101 |
| | PORT 2 | SUB | 192.168.0.102 |
| | PORT 3 | SUB | 192.168.0.103 |
| MFP-B | PORT 4 | MAIN | 192.168.0.104 |
| | PORT 5 | SUB | 192.168.0.105 |

FIG. 6

| MODEL NAME | PORT NAME | AUTOMATIC CONNECTION |
|---|---|---|
| MFP-A | PORT 2 | ○ |
| | PORT 3 | ○ |
| MFP-B | PORT 5 | × |

FIG. 7A

| MODEL NAME | PORT NAME | PRIORITY ORDER |
|---|---|---|
| MFP-A | PORT 2 | 1 |
| | PORT 3 | 2 |
| MFP-B | PORT 5 | — |

FIG. 7B

SYSTEM INCLUDING INFORMATION PROCESSING DEVICE, AND MULTIPLE DEVICES CONNECTED TO INFORMATION PROCESSING DEVICE VIA A NETWORK, AND INFORMATION PROCESSING DEVICE AND NON-TRANSITORY COMPUTER-READABLE RECORDING MEDIUM FOR SETTING CONNECTION DESTINATION OF INFORMATION PROCESSING DEVICE

CROSS-REFERENCE TO RELATED APPLICATION

This application is a continuation application of U.S. Ser. No. 16/257,117 filed on Jan. 25, 2019 and claims priority from Japanese Patent Application No. 2018-015812 filed on Jan. 31, 2018. The entire disclosures of the prior applications are incorporated herein by reference.

BACKGROUND

Technical Field

The present disclosures relate to an image forming system, an information processing device for controlling the image forming system, and a non-transitory computer-readable recording medium for the information processing device.

Related Art

There has been known a conventional information processing device provided with a driver configured to request an image forming device to execute jobs, and a status monitor configured to receive status information from the image forming device and to display the status information on a display device.

SUMMARY

There is a case where the image forming device and the information processing device are connected via a communication network. If failure occurs in the communication network or the image forming device, or if the image forming device is turned off, communication between the information processing device and the image forming device becomes impossible and therefore the image forming device becomes in a so-called offline state. In such a case, a user of the information processing device cannot execute printing using the image forming device until the communication between the information processing device and the image forming device is recovered and the image forming device becomes in a so-called online state.

There is a case where the user of the known information processing device does not become aware that the image forming device is offline until a notification notifying printing failure with the image forming device is displayed on a display of the information processing device. In such a case, since the user will start dealing with the offline state of the image forming device after the printing failure notification is displayed, execution of printing will be delayed significantly than the user intended and therefore such an image forming system is inconvenient to use.

According to aspects of the present disclosure, there is provided a non-transitory computer-readable recording medium storing computer-readable instructions for an information processing device including a network interface, a memory and a processor, the memory storing connection destination setting data and connection destination candidate data, the connection destination setting data initially indicating a first connection destination corresponding to a first first-type image forming device connected to the information processing device via a network as a set connection destination of a first device driver which supports first-type image forming devices, and the connection destination candidate data indicating multiple connection destinations respectively corresponding to multiple first-type image forming devices connected to the information processing device via a network. The computer-readable instructions cause, when executed by the processor of the information processing device, the information processing device to perform a first obtaining process of obtaining, from the memory, the connection destination setting data, the first device driver being configured to transmit, through the network interface, an image forming instruction to a first-type image forming device through the set connection destination indicated in the connection destination setting data, a first determination process of determining whether the first first-type image forming device corresponding to the first connection destination is online or offline with the network, a first identification process of identifying, in response to determining in the first determination process that the first first-type image forming device is offline with the network, among the multiple connection destinations indicated by the connection destination candidate data, a second connection destination that is different from the first connection destination and corresponding to a second first-type image forming device which is online with the network, and a first update process of updating the connection destination setting data to indicate the second connection destination identified by the first identification process as the set connection destination.

According to other aspects of the present disclosure, there is provided an information processing device including a memory, a network interface, and a controller. The memory stores connection destination setting data initially indicating a first connection destination corresponding to a first first-type image forming device connected to the information processing device via a network as a set connection destination of a first device driver which supports first-type image forming devices. The controller is configured to obtain, from the memory, the connection destination setting data, the first device driver being configured to transmit, through the network interface, an image forming instruction to a first-type image forming device through the set connection destination indicated in the connection destination setting data, determine whether the first first-type image forming device corresponding to the first connection destination is online or offline with the network, identify, in response to determining that the first first-type image forming device is offline with the network, a second connection destination that is different from the first connection destination and corresponding to a second first-type image forming device connected to the information processing device via the network and being online with the network, and update the connection destination setting data to indicate the second connection destination as the set connection destination.

According to still other aspects of the present disclosure, there is provided an image forming system including an information processing device and multiple image forming devices connected to the information processing device via a network, the image forming devices respectively corresponding to multiple connection destinations prepared in the information processing device, the information processing device including a memory and a network interface, the memory storing connection destination setting data initially indicating a first connection destination corresponding to a first first-type image forming device as a set connection destination of a first device driver which supports first-type image forming devices, and a controller. The controller is configured to obtain, from the memory, the connection destination setting data, the first device driver being configured to transmit, through the network interface, an image forming instruction to a first-type image forming device through the set connection destination indicated in the connection destination setting data, determine whether the first first-type image forming device corresponding to the first connection destination is online or offline with the network, identify, in response to determining that the first first-type image forming device is offline, a second connection destination that is different from the first connection destination and corresponding to a second first-type image forming device which is online with the network, and update the connection destination setting data to indicate the second connection destination as the set connection destination.

BRIEF DESCRIPTION OF THE ACCOMPANYING DRAWINGS

FIG. 6 is a diagram showing exemplary connection destination candidate data stored in the memory.

FIG. 7A is a diagram showing exemplary automatic connection setting data stored in the memory.

FIG. 7B is a diagram showing exemplary priority order setting data stored in the memory.

DETAILED DESCRIPTION

Hereinafter, an embodiment of the present disclosures will be described with reference to the drawings. It is noted that the following embodiment is only an example of the present disclosures. The embodiment of the present disclosures can be modified in various ways without departing from aspects of the present disclosures. For example, orders for executing processes described below can be modified within aspects of the present disclosures.

Figure 1:
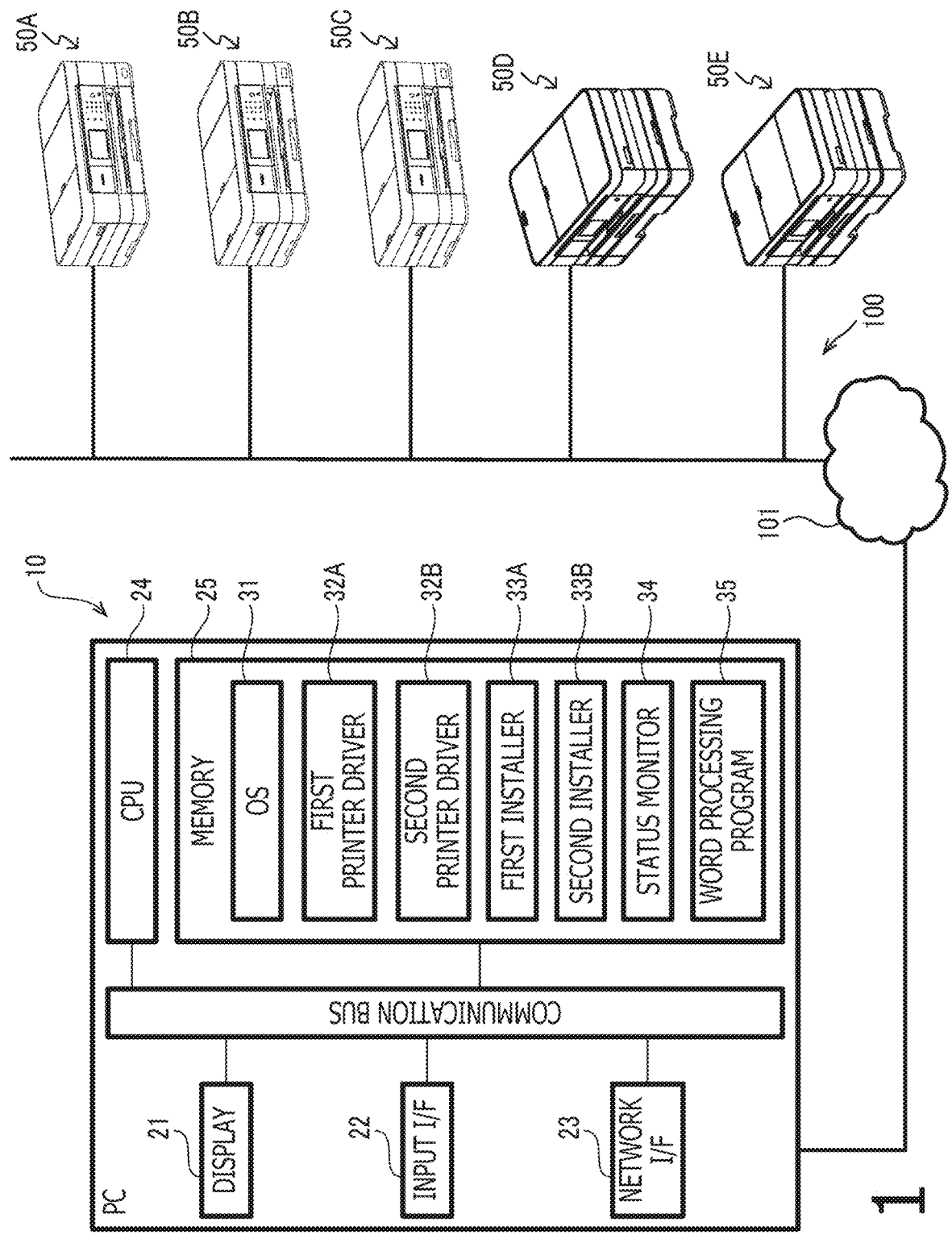
FIG. 1 is a block diagram of a system according to an embodiment of the present disclosures.

FIG. 1 a schematic diagram of a system 100 according to the present embodiment. The system 100 shown in FIG. 1 includes a PC 10 and five Multi-Function Peripherals (MFPs) 50A-50E (hereinafter occasionally and collectively referred to as MFP(s) 50). The PC 10 is an example of an information processing device. The MFP 50 is an example an image forming device. In the example shown, five MFPs 50 are shown, but the number of MFP(s) 50 is not limited to five. Also, the system 100 may include one or more single-function machines functioning only as printers in place of or in addition to the MFP(s) 50.

The PC 10 and the MFPs 50 are configured to be mutually communicatable through a communication network 101. Specific examples of the communication network 101 are, but are not limited to, the internet, a wired LAN, a wireless LAN, or a combination thereof in part or in all. Also, the PC 10 and the MFPs 50 may be connected through USB cables or the like.

The PC 10 mainly includes a display 21, an input I/F 22, a network I/F 23, a CPU 24, a memory 25 and a communication bus 26. The components configuring the PC 10 are mutually connected through the communication bus 26.

The display 21 is a liquid crystal display, an organic EL display or the like, and includes a display screen configured to display various pieces of information.

The input I/F 22 is a user interface configured to receive input operation by a user. Specifically, the input I/F 22 is a keyboard and/or a mouse and outputs various operation signals to the CPU 24. Furthermore, the input I/F 22 may include a membranous touch sensor overlaid on a display surface of the display 21. Operations for designating objects displayed on the display surface of the display 21 and/or for inputting character strings and/or numeric strings are examples of user operations. The term "object" means, for example, a character string, an icon, a button, a link, a radio button, a check box, a pull-down menu or the like.

The input I/F 22 realized by the touch sensor outputs position information indicating a position on the display surface where the user has touched. It is noted that the term "touch" in this specification includes every kind of operations in which an input medium is brought into contact with the display surface. Also, a so-called "hover" or "floating touch" in which the input medium is not brought into contact with the display surface but is brought close to the display surface may be included in the concept of the term "touch" described above. Furthermore, the input medium may be a finger of the user, a touch pen or the like. An operation in which the user taps a position of an object displayed on the display 21 is an example of an input operation for designating the object.

The network I/F 23 is an interface communicatable with external devices through the communication network 101. That is, the PC 10 transmits various pieces of information to the external devices through the network I/F 23 and receives various pieces of information from the external devices through the network I/F 23. Specific communication method the network I/F 23 uses is, for example, but not limited to, Wi-Fi®. Also, if the PC 10 and the MFPs 50 are connected through USB cables, the network I/F 23 may be a USB interface to which the USB cables can be detachably attached.

The CPU 24 controls the entire operation of the PC 10. The CPU 24 obtains various programs which will be described below from the memory 25 and executes them based on various pieces of information output from the input I/F 22 and various pieces of information received from the external devices through the network I/F 23. The CPU 24 is an example of a computer.

Figure 5C:
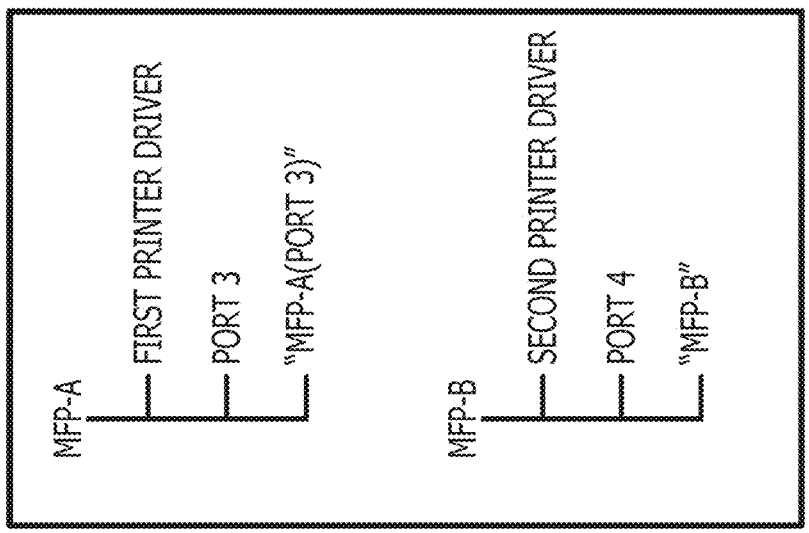
FIG. 5C is a diagram showing exemplary connection destination setting data stored in the memory.
Figure 5B:
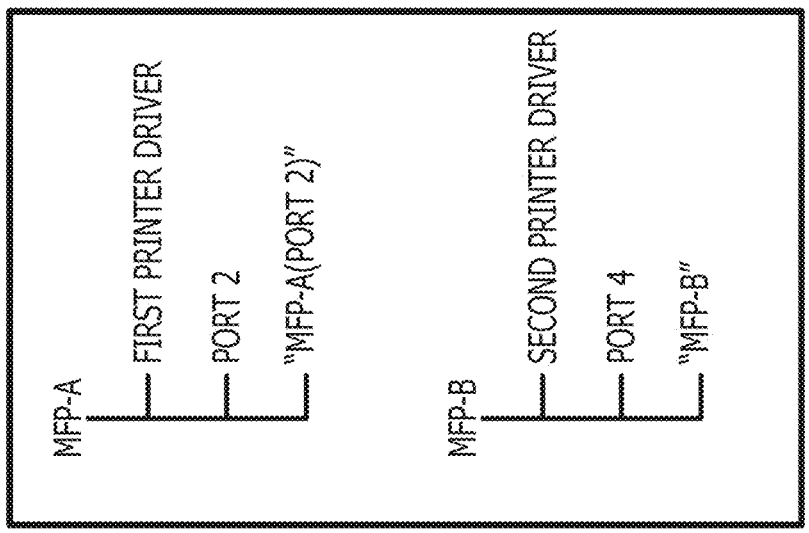
FIG. 5B is a diagram showing exemplary connection destination setting data stored in the memory.

The memory 25 stores an OS 31, a first printer driver 32A and a second printer driver 32B (hereinafter occasionally and collectively referred to as "printer driver(s) 32"), a first installer 33A and a second installer 33B (hereinafter occasionally referred to as "installer(s) 33"), a status monitor 34, a word processing program 35, connection destination setting data (FIGS. 5A-5C), connection destination candidate data (FIG. 6), automatic connection setting data (FIG. 7A), priority order setting data (FIG. 7B) and monitoring target data. Also, the memory 25 stores data and/or information necessary to execute programs. The memory 25 is configured by, for example, a RAM, a ROM, an EEPROM, an HDD, a portable storage medium such as a USB memory detachably attached to the PC 10, a buffer the CPU 24 includes, or a combination thereof in part or in all.

The memory 25 may be a computer-readable storage medium. The computer-readable storage medium means a non-transitory medium. The non-transitory medium includes, in addition to those listed above, a storage medium such as a CD-ROM or a DVD-ROM. The non-transitory medium is a tangible medium as well. On the other hand, an electrical signal carrying programs to be downloaded from servers or the like through the internet is a computer-readable signal medium being a kind of computer-readable media, but should not be included in the non-transitory computer-readable storage medium.

The printer driver 32 is a program configured to transmit a printing instruction instructing an MFP 50 of a supported model to execute printing through the network I/F 23. Specifically, the printer driver 32 outputs the printing instruction to a printing port, indicated by a registry, assigned to the printer driver 32. The registry is a storage area defined by the OS 31. Programs such as the printer driver 32 refer to information stored in the registry to cooperate with the OS 31. The printer driver 32 operates on a printing system the OS 31 has. In the example shown in the drawings, the first printer driver 32A and the second printer driver 32B are shown, but the number of printer driver 32 is not limited to two. In the present embodiment, the first printer driver 32A supports an MFP 50A, an MFP 50B and an MFP 50C whose model names are MFP-A, and the second printer driver 32B supports an MFP 50D and an MFP 50E whose model names are MFP-B. The first printer driver 32A and the second printer driver 32B are examples of a device driver. The MFPs 50A-50C are examples of a first-type image forming device. The printing port is an example of a connection destination.

The installer 33 is a program configured to install the printer driver 32 and the status monitor 34 to the PC 10. In the example shown in the drawings, the first installer 33A and the second installer 33B are shown, but the number of installer 33 is not limited to two. In the present embodiment, the first installer 33A installs the first printer driver 32A to the PC 10, and the second installer 33B installs the second printer driver 32B to the PC 10. The first installer 33A and the second installer 33B are examples of a first instruction.

The status monitor 34 is a program configured to monitor a status of the MFP 50 corresponding to the printing port assigned to the printer driver 32 and, when the MFP 50 becomes offline, change the printing port assigned to the printer driver 32 to another printing port corresponding to another MFP 50 being online. The status monitor 34 is an example of a second program.

The word processing program 35 is a program configured to create documents. When the user of the PC 10 instructs printing of a created document through the input I/F 22, the word processing program 35 outputs, to the OS 31, image data showing an image of the document which were instructed to be printed. The printer driver 32 obtains the image data output by the word processing program 35 via the OS 31, converts the obtained image data to a format that the MFP 50 can process, and transmits the converted image data to the MFP 50. The image data showing the image of the document created by the word processing program is an example of image data.

The connection destination setting data (see FIG. 5) is a registry indicating the printing ports provided by the OS 31 for use with the printing system and assigned to the printer drivers 32. In other words, the connection destination setting data includes information indicating a set connection destination of the printer driver 32. The connection destination setting data includes display character strings to be displayed on first to third screens which will be described later. In the example shown in FIG. 5A, Port 1 is assigned to the first printer driver 32A supporting the model MFP-A, and the display character string corresponding to the first printer driver 32A is "MFP-A." Similarly, Port 4 is assigned to the second printer driver 32B supporting the model MFP-B, and the display character string corresponding to the second printer driver 32B is "MFP-B."

The connection destination candidate data (see FIG. 6) is data indicating printing ports corresponding to the MFPs 50 of the models supported by the printer drivers 32, and IP addresses of the MFPs 50 corresponding to the printing ports. The printing ports indicated by the connection destination candidate data include printing ports assigned to the printer drivers 32 when the printer drivers 32 were installed (hereinafter occasionally referred to as "main ports") and printing ports corresponding to other MFPs 50 (hereinafter occasionally referred to as "sub ports"). In the example shown in the drawings, the connection destination candidate data indicates Port 1 being the main port and Port 2 and Port 3 being the sub ports, each port corresponding to the MFP 50 whose model is MFP-A supported by the first printer driver 32A. The connection destination candidate data further indicates Port 4 being the main port and Port 5 being the sub port, each port corresponding to the MFP 50 whose model is MFP-B supported by the second printer driver 32B.

The automatic connection setting data (see FIG. 7A) is data indicating a setting, for each printing port, whether to permit automatic connection with the PC 10. The automatic connection with the PC 10 means execution, by the status monitor 34, of a change of the printing port assigned to the printer driver 32 to a candidate port, which will be described later, without receiving an input operation indicating the user's acceptance. Exemplary automatic connection setting data shown in the drawing indicates a setting in which the automatic connections of Port 2 and Port 3 to the PC 10 are permitted, while the automatic connection of Port 5 to the PC 10 is not permitted.

The priority order setting data (see FIG. 7B) is data indicating a priority order setting for the connection with the PC 10 being set for each printing port. Exemplary priority order setting data shown in the drawing indicates a setting in which priority order "1" is set to Port 2, priority order "2" is set to Port 3, and no priority order is set to Port 5.

The monitoring target data is data indicating, for each of a plurality of printer drivers 32 installed to the PC 10, whether to make a monitoring target by the status monitor 34.

The MFP 50 mainly includes a network I/F, a CPU, a memory, a communication bus and a printer. Since the network I/F, the CPU, the memory and the communication bus included in the MFP 50 have configurations similar to the network I/F 23, the CPU 24, the memory 25 and the communication bus 26 included in the PC 10, detailed descriptions thereof are herein omitted.

The printer executes a printing operation for recording an image indicated by image data on a sheet. As a recording system of the printer, well-known methods such as the inkjet system or the electrophotographic system can be adopted.

The memory of the MFP 50 stores an IP address and a MAC address assigned thereto, and a Management Information Base (hereinafter referred to as an "MIB"). The MIB is, for example, a set of pieces of information including the model name such as "MFP-A," device information and the like. The device information is information indicating functions that the MFP 50 can execute, such as "monochrome only," "color/monochrome," "simplex printing only," simplex printing/duplex printing," "A4 only," "A4/B5/A3/letter," capability of scanning (e.g., "scanning function being available" or "scanning function not being available").

Figure 2:
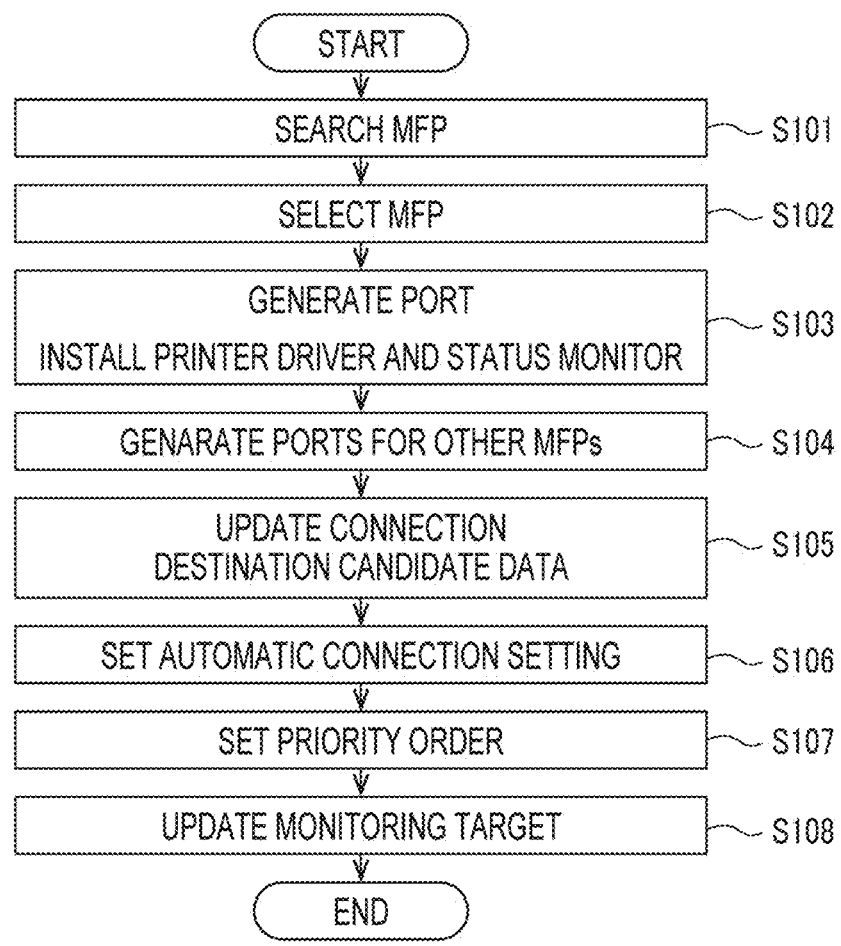
FIG. 2 is a flow chart of an install process.
Figure 3:
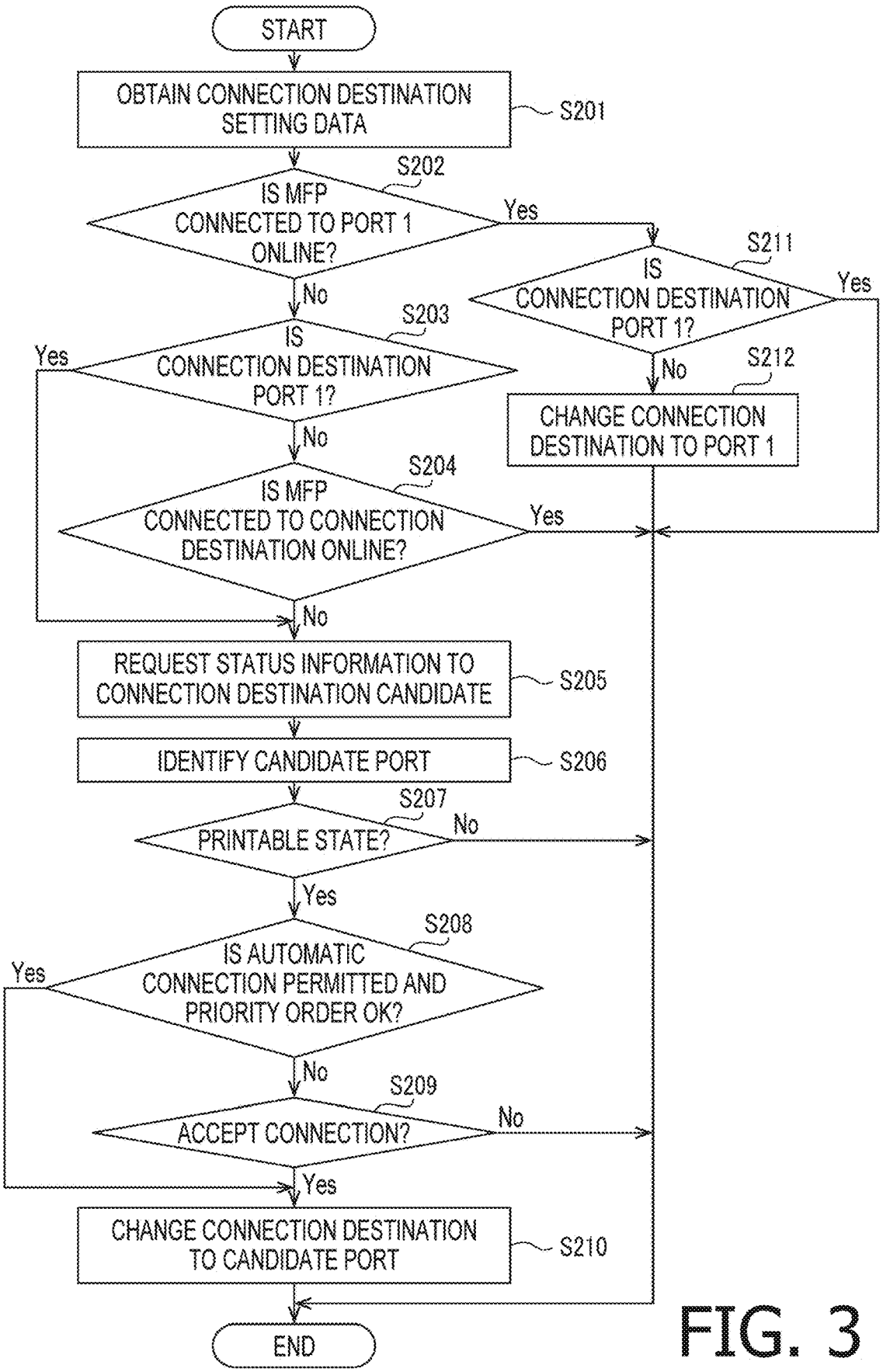
FIG. 3 is a flow chart of a port monitoring process.
Figure 4:
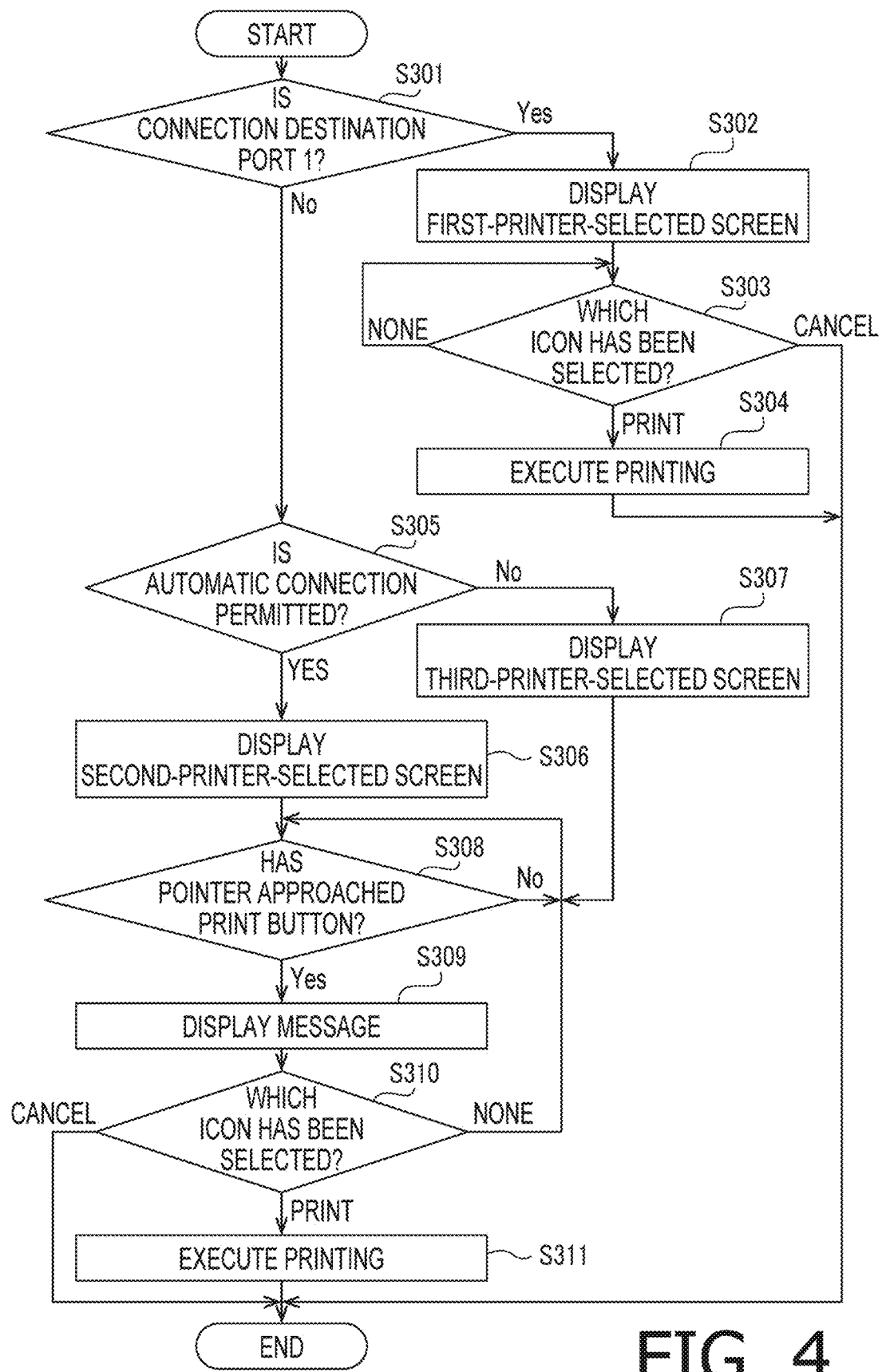
FIG. 4 is a flow chart of a printing process.

Operations of the system 100 according to the present embodiment will be described with reference to FIGS. 2-4. In the system 100 according to the present embodiment, an install process shown in FIG. 2, a port monitoring process shown in FIG. 3 and a printing process shown in FIG. 4 are performed.

Flow charts in the present disclosures basically indicate processes executed by the CPU 24 in accordance with instructions described in programs. That is, each of terms "determination," "selection," "identification," "control" and the like appearing in the following description indicates a process executed by the CPU 24. The processes executed by the CPU 24 also include hardware controls via the OS 31. It is noted that the term "obtaining" in the present disclosures does not necessarily requires a request. That is, a process in which a CPU receives data without request is included in "the CPU obtains data." It is also noted that the term "data" appearing in the present disclosures is expressed with computer-readable bit strings. Furthermore, pieces of data having substantially the same meaning/content but having different formats are treated as identical pieces of data. Similar interpretations apply to the term "information" appearing in the present disclosures. Processes such as "instruction," "response" and "request" are executed by transmitting information indicating the "instruction," the "response" and the "request." Also, the terms "instruction," "response," "request" and the like may be used to mean pieces of information that respectively indicate the "instruction," the "response" and the "request."

There are cases where the processes executed by the CPU 24 in accordance with instructions described in the programs are described in abbreviated manners. For example, there are cases where such processes are described as "the CPU 24 executes," "the status monitor 34 executes" or the like.

There is a case where a process that "the CPU 24 determines whether or not information A indicates a matter is B" will occasionally be described in a conceptual manner such as "the CPU 24 determines whether or not a matter is B based on information A." Further, there are cases where a process that "the CPU 24 determines whether information A indicates that a matter is B or C" will occasionally be described in a conceptual manner such as "the CPU 24 determines whether a matter is B or C based on information A."

The install process will be described with reference to FIG. 2. First, when activated by the user, the first installer 33A of the PC 10 identifies, among the MFPs 50 connected to the communication network 101, MFPs 50 being online and whose model names are MFP-A, generates a device list including IP addresses of the identified MFPs 50, and stores the generated device list in the memory 25 (S101).

For example, the first installer 33A broadcasts request information to the communication network 101 through the network I/F 23. The request information includes information requesting a recipient to send back information including a MAC address, an IP address and an MIB of the recipient, and an IP address and a MAC address of the transmitter (i.e., the PC 10). For example, when an MFP 50 received the request information, it sends back response information including the MAC address, IP address and MIB of the MFP 50 to the PC 10, which is the transmitter of the request information.

In response to receiving the response information transmitted by the MFP 50 within a predetermined time period from the transmission of the request information, the first installer 33A determines that the MFP 50 is online. The first installer 33A determines whether the model name of the MFP 50 which transmitted the response information is MFP-A based on the model name included in the received response information. The first printer driver 32A obtains the IP address of the MFP 50, determined to be online and being the MFP-A, from the response information, generates a device list including the obtained IP address, and stores the generated device list in the memory 25.

Then, the first installer 33A receives an input operation by a user for designating one MFP 50 (i.e., one printing port) to be assigned to the first printer driver 32A through the input I/F 22 (S102). S102 is an example of a first reception process.

For example, the first installer 33A displays, on the display 21, an MFP selection screen indicating the IP addresses of the MFPs 50 the device list generated in S101 indicates, and receives user designation of one MFP 50. Upon determining that the user designation of one MFP 50 has been received, the first installer 33A temporarily stores the IP address of the MFP 50 designated by the user in the memory 25. In the present embodiment, it is assumed that the MFP 50A has been designated by the user.

Then, the first installer 33A requests the OS 31 to generate a printing port corresponding to the MFP 50 designated by the user in S102 (S103). The OS 31 generates the printing port corresponding to the IP address of the MFP 50 designated by the user in S102. In generating the printing port, the OS 31 determines to use a character string indicating the IP address as a port name, determines a program (e.g., a port monitor) for communication with the IP address as the destination, and stores the determined port name, the IP address of the MFP 50, and information indicating the determined program in the registry while associating them with each other. In the present embodiment, it is assumed that Port 1, being the main port, has been generated as the printing port corresponding to the MFP 50A. The first installer 33A installs the first printer driver 32A to the PC 10 and updates the connection destination setting data such that Port 1 generated by the OS 31 becomes the printing port assigned to the first printer driver 32A. Specifically, the first installer 33A determines a printer name indicating the MFP 50A and stores the determined printer name and a port name of Port 1 while associating them with each other in an area within the registry generated by the OS 31 for storing information of the first printer driver 32A. For example, the first installer 33A determines to use a character string including the model name as the printer name. In the present disclosures, description will be made while assuming that the first installer 33A determined the printer name to be "MFP-A." Programs which use the printer driver, such as the word processing program 35, displays a plurality of printer names stored in the registry as a list of printers the user can select, and upon receiving a user operation selecting one printer name, stores the printer name in the memory 25, and uses the printer name when a printing instruction is received. In the present disclosures, description will be made while assuming that the text program 35 received a selection of the printer name "MFP-A" and stored the printer name in the memory 25. The first installer 33A installs the status monitor 34 to the PC 10 (S103). S103 is an example of a first request process, a fourth update process and an installation process. Port 1 is an example of a first connection destination.

Then, the first installer 33A requests the OS 31 to generate printing ports respectively corresponding to MFPs 50, among the MFPs 50 identified in S101, that have not been designated by the user in S102 (S104). In response to the request by the first installer 33A, the OS 31 generates the printing ports respectively corresponding to IP addresses of the MFPs 50. In the present embodiment, it is assumed that Port 2 is generated as a printing port corresponding to the MFP 50B, and Port 3 is generated as a printing port corresponding to the MFP 50C. Port 2 and Port 3 are sub ports. S104 is an example of a second request process.

Then, the first installer 33A updates the connection destination candidate data such that the connection destination candidate data indicates the printing ports generated in S103 and the printing ports generated in S104. For example, the first installer 33A updates the connection destination candidate data such that the connection destination candidate data indicates Ports 1-3 as the printing ports for the model MFP-A. S105 is an example of a fifth update process.

Then, the first installer 33A receives, through the input I/F 22, operation inputs by the user designating whether to permit the automatic connection of the printing ports generated in S104 to the PC 10 (S106). The first installer 33A generate the automatic connection setting data based on the received user designations and stores the generated automatic connection setting data in the memory 25 (S106). S106 is an example of a second reception process and a first generation process.

For example, the first installer 33A displays, on the display 21, an automatic connection setting input screen indicating Port 2 and Port 3 generated in S104, and receives input operations by the user designating whether to permit or to forbid automatic connections with Port 2 and Port 3. Upon determining that the user designations have been received, the first installer 33A generates the automatic connection setting data indicating whether to permit or to forbid the automatic connections with Port 2 and Port 3 and stores the generated automatic connection setting data in the memory 25. It is noted that whether to permit the automatic connection of each MFP 50 to the PC 10 may be decided by a manager of the system 100. In this case, the user performs the input operations designating whether to permit or to forbid the automatic connections in accordance with the manager's decision. The input operations designating whether to permit or to forbid the automatic connections may be performed by the manager.

Then, the first installer 33A receives, through the input I/F 22, input operations by the user designating the priority orders of the printing ports generated in S104 for the connection with the PC 10 (S107). The first installer 33A generates the priority order setting data based on the received user designations and stores the generated priority order setting data in the memory 25 (S107). S107 is an example of a fourth reception process and a second generation process.

for example, the first installer 33A displays, on the display 21, a priority order input screen indicating Port 2 and Port 3 generated in S104, and receives user designations of the priority orders of Port 2 and Port 3 for the connection with the PC 10. Upon determining that the user designations have been received, the first installer 33A generates the priority order setting data indicating the designated priority orders of Port 2 and Port 3 and stores the generated priority order setting data to the memory 25. It is noted that the priority orders for the connection with the PC 10 may be determined by the user.

Then, the first installer 33A receives, through the input I/F 22, input operations by the user designating whether to make the installed first printer driver 32A a monitoring target by the status monitor 34 (S108). The first installer 33A updates the monitoring target data stored in the memory 25 based on the received user designation (S108). S108 is an example of a sixth update process.

By the aforementioned processes S101 to S108, the first printer driver 32A and the status monitor 34 are installed in the PC 10, and the connection destination setting data is updated such that Port 1, being the printing port corresponding to the MFP 50A, becomes the printing port assigned to the first printer driver 32A.

When activated by the user, the second installer 33B executes processes similar to the aforementioned processes S101 to S108 to install the second printer driver 32B and the PC 10. For example, the second installer 33B updates the connection destination setting data such that Port 4, being the printing port corresponding to the MFP 50D whose model name is MFP-B, becomes the printing port assigned to the second printer driver 32B. It is noted that, since the status monitor 34 is already installed by the first installer 33A, the installation of the status monitor 34 in S103 will not be executed.

The port monitoring process will be described with reference to FIG. 3. When activated by the user of the PC 10, the status monitor 34 executes the port monitoring process shown in FIG. 3 for the printer driver(s) 32 which the monitoring target data indicates as the monitoring target(s) by the status monitor 34. If a plurality of printer drivers 32 are the monitoring targets, the status monitor 34 executes the port monitoring process shown in FIG. 3 for the plurality of printer drivers 32 in turn. Hereinafter, a case where the first printer driver 32A is the monitoring target will be described. It is noted that the port monitoring process shown in FIG. 3 is repeatedly executed at predetermined time intervals while the PC 10 is active.

First, the status monitor 34 obtains the connection destination setting data from the memory 25 (S201). S201 is an example of a first obtaining process.

Then, the status monitor 34 determines whether the MFP 50A, corresponding to Port 1, being the main port indicated by the connection destination candidate data, is online (S202). S202 is an example of a second determination process.

For example, the status monitor 34 transmits, through the network I/F 23, a response request to the MFP 50A corresponding to Port 1. In response to receiving, through the network I/F 23, a response to the response request within a predetermined time period, the status monitor 34 determines that the MFP 50A corresponding to Port 1 is online (S202: YES), and in response to not receiving, through the network I/F 23, a response to the response request within a predetermined time period, the status monitor 34 determines that the MFP 50A corresponding to Port 1 is offline (S202: NO). It is noted that the response request includes information requesting a recipient to send back information including a MAC address, an IP address and an MIB of the recipient, and an IP address and a MAC address of the transmitter (i.e., the PC 10). For example, when an MFP 50 received the response request, it sends back response information including the MAC address, IP address and MIB of the MFP 50 to the PC 10, which is the transmitter of the request information. Hereinafter, the determination as to whether an MFP corresponding to a printing port is online is performed in a manner similar to the aforementioned manner.

If it is determined that the MFP 50A corresponding to Port 1 is offline (S202: No), the status monitor 34 determines whether the connection destination of the first printer driver 32A indicated by the connection destination setting data is Port 1 being the main port indicated by the connection destination candidate data (S203).

If it is determined that the connection destination of the first printer driver 32A indicated by the connection destination setting data is not Port 1 (S203: No), the status monitor 34 determines whether the MFP 50 corresponding to the connection destination of the first printer driver 32A indicated by the connection destination setting data is online (S204). S204 is an example of a third determination process.

If it is determined that the MFP 50 corresponding to the connection destination of the first printer driver 32A is online (S204: Yes), the status monitor 34 terminates the port monitoring process. S202 and S203 are examples of a first determination process.

If it is determined that the connection destination of the first printer driver 32A indicated by the connection destination setting data is Port 1 (S203: Yes), or if it is determined that the MFP 50 corresponding to the connection destination of the first printer driver 32A indicated by the connection destination setting data is offline (S204: No), the status monitor 34 requests status information to connection destinations except for Port 1 being the main port (S205). For example, the status monitor 34 transmits, through the network I/F 23, status request information to the MFP 50B corresponding to Port 2 and the MFP 50C corresponding to Port 3. It is noted that the status request information includes information requesting a recipient to send back a MAC address, an IP address and status information of a recipient, and an IP address and a MAC address of the transmitter (i.e., the PC 10). For example, when an MFP 50 received the status request information, it sends back the MAC address, IP address and status information of the MFP 50 to the PC 10, which is the transmitter of the request information. The status information is information indicating whether the MFP 50 which has sent the status information is in a printable state. The status information includes, for example, information regarding whether the MPF 50 is out of paper, has run out of ink, and is under maintenance (e.g., a cover is open).

In response to receiving the status information sent from an MFP 50 within a predetermined time period from the transmission of the status request information, the status monitor 34 determines that the MFP 50 which has transmitted the status information is online. The status monitor 34 identifies one of printing ports, corresponding to the MFPs 50 determined to be online, having highest priority order indicated by the priority setting data as a candidate port (S206). S206 is an example of a first identification process. The candidate port is an example of a second connection destination and a third connection destination.

The status monitor 34 determines whether the MFP 50 corresponding to the candidate port identified in S206 is in the printable state based on the status information received from the MFP 50 (S207). For example, the status monitor 34 determines that an MFP 50 is not in the printable state if the status information indicates that the MFP 50 is out of paper, has run out of ink, or is under maintenance. In response to determining that the MFP 50 corresponding to the candidate port is not in the printable state (S207: No), the status monitor 34 terminates the port monitoring process. S207 is an example of a fourth determination process.

Upon determining that the MFP 50 corresponding to the candidate port is in the printable state (S207: Yes), the status monitor 34 determines whether the candidate port is a connection destination which the automatic connection with the PC 10 is permitted, and determines whether the priority order setting data indicates a priority order of the candidate port (S208). S208 is an example of a fifth determination process and a sixth determination process.

In response to determining that the candidate port is not a connection destination which the automatic connection with the PC 10 is permitted or that the priority order is not set to the candidate port (S208: No), the status monitor 34 receives, through the input I/F 22, an operation input by the user specifying whether to accept connection of the PC 10 to the candidate port (S209). S209 is an example of a third reception process and a fifth reception process.

For example, the status monitor 34 displays a connection accepting screen on the display 21. The connection accepting screen has a character string "Since the main printer is offline, this device will be connected to a printer which the automatic connection is not permitted." a "YES" icon and a "NO" icon displayed thereon. The status monitor 34 monitors a selection of an icon by the user. Upon determining that the user has selected an icon, the status monitor 34 determines which icon has been selected by the user. Upon determining that the user has selected the "NO" icon (S209: No), the status monitor 34 terminates the port monitoring process.

Upon determining that the user has selected the "YES" icon (S209: Yes), or upon determining in S208 that the candidate port is the connection destination which the automatic connection is permitted and that the priority order is set to the candidate port (S208: Yes), the status monitor 34 updates the connection destination setting data to indicate the candidate port identified in S206 as the printing port assigned to the first printer driver 32A (S210). The status monitor 34 changes the display character string corresponding to the first printer driver 32A to the character string corresponding to the candidate port (S210).

For example, the status monitor 34 changes the printing port, assigned to the first printer driver 32A in the registry being the connection destination setting data, to the candidate port identified in S206, and add a character string, indicating a port name of the candidate port (e.g., "Port 2"), to the display character string corresponding to the first printer driver 32A. Then, the status monitor 34 terminates the port monitoring process. S210 is an example of a first update process and a third update process.

Upon determining in S202 that the MFP 50A corresponding to Port 1 is online (S202: Yes), the status monitor 34 determines whether the connection destination of the first printer driver 32A indicated by the connection destination setting data is Port 1 being the main port indicated by the connection destination candidate data (S211). Upon determining that the printing port, being the connection destination of the first printer driver 32A, indicated by the connection destination setting data is Port 1 (S211: Yes), the status monitor 34 terminates the port monitoring process.

Upon determining that the connection destination of the first printer driver 32A indicated by the connection destination setting data is not Port 1 (S211: No), the status monitor 34 updates the connection destination setting data to indicate that the printing port assigned to the first printer driver 32A is Port 1 being the main port. The status monitor 34 changes the display character string, included in the connection destination setting data and corresponding to the first printer driver 32A, to a character string corresponding to Port 1 (S212). Then, the status monitor 34 terminates the port monitoring process. S212 is an example of a second update process.

Figure 5A:
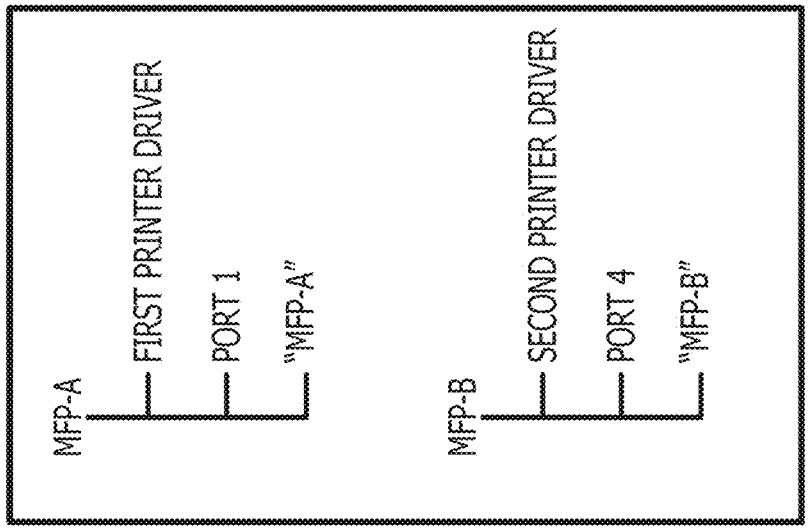
FIG. 5A is a diagram showing exemplary connection destination setting data stored in a memory.

The aforementioned port monitoring process will be described with a specific example. It is assumed that the first printer driver 32A and the status monitor 34 is installed in the PC 10 by the first installer 33A, and that the printer driver 32A is assigned with Port 1 corresponding to the MFP 50A. It also assumed that, as shown in FIG. 5A, the connection destination setting data being the registry indicates that the connection destination of the first printer driver 32A supporting the model MFP-A is Port 1, and that the display character string corresponding to the first printer driver 32A is "MFP-A."

It is also assumed that, as shown in FIG. 6, the connection destination candidate data indicates Port 1 being the main port, Port 2 being the sub port and corresponding to the MFP 50B, and Port 3 being the sub port and corresponding to the MFP 50C. It is also assumed that, as shown in FIG. 7A, the automatic connection setting data indicates, regarding the automatic connection with the PC 10, that Port 2 and Port 3 are permitted. It is further assumed that, as shown in FIG. 7B, the priority order setting data indicates that the priority order of Port 2 is set to "1" and the priority order of Port 3 is set to "2."

If the port monitoring process is executed while the MFP 50A corresponding to Port 1 is online, the status monitor 34 determines that S202 is Yes and S211 is Yes, and terminates the port monitoring process. The printing port assigned to the first printer driver 32A is not changed.

If the port monitoring process is executed while the MFP 50A corresponding to Port 1 is offline but the MFP 50B and the MFP 50C are online and are in the printable states, the status monitor 34 determines that S202 is No and S03 is Yes, and executes processes of S205 and S206. The status monitor 34 identifies Port 2 which the MFP 50B corresponding thereto is online and having the highest priority order as the candidate port. The status monitor determines that S207 is Yes and S208 is Yes. The status monitor 34 executes S210 to update the registry being the connection destination setting data such that the connection destination of the first printer driver 32A becomes Port 2. At this time, the connection destination setting data is in a state shown in FIG. 5B, indicating that the connection destination of the first printer driver 32A supporting the model MFP-A is Port 2 and that the display character string corresponding to the first printer driver 32A is "MFP-A (Port 2)." By the aforementioned processes, the connection destination of the first printer driver 32A changes from Port 1 which the MFP 50A corresponding thereto is offline to Port 2 which the MFP 50B corresponding thereto is online and is in the printable state.

If the port monitoring process is executed after the connection destination of the first printer driver 32A has been changed to Port 2 and the MFP 50A corresponding to Port 1 has become online, the status monitor 34 determines that S202 is Yes and S203 is No. The status monitor 34 executes S212 to update the registry being the connection destination setting data such that to the connection destination of the first printer driver 32A becomes Port 1. By the aforementioned processes, the connection destination of the first printer driver 32A changes from Port 2 corresponding to the MFP 50B to Port 1 corresponding to the MFP 50A which has become online. At this time, the connection destination setting data is in a state shown in FIG. 5A.

If the port monitoring process is executed after the connection destination of the first printer driver 32A has been changed to Port 2, both the MFP 50A and the MFP 50B respectively corresponding to Port 1 and Port 2 have become offline and the MFP 50C corresponding to Port 3 is online, the status monitor 34 determines that S202 is No, S203 is No and S204 is No. The status monitor 34 identifies Port 3 which the MFP 50C corresponding thereto is online and having the highest priority order as the candidate port. The status monitor 34 then determines that S207 is Yes and S208 is Yes. The status monitor 34 executes S210 to update the registry being the connection destination setting data such that the connection destination of the first printer driver 32A becomes Port 3. At this time, the connection destination setting data is in a state shown in FIG. 5C, indicating that the connection destination of the first printer driver 32A supporting the model MFP-A is Port 3 and that the display character string corresponding to the first printer driver 32A is "MFP-A (Port 3)." By the aforementioned processes, the connection destination of the first printer driver 32A changes from Port 2 which the MFP 50B corresponding thereto is offline to Port 3 which the MFP 50C corresponding thereto is online and being in the printable state.

The printing process will be described with reference to FIG. 4. Upon determining that the user has instructed, through the input I/F 22, printing of a generated document, the word processing program 35 reads out the printer name "MFP-A" stored in the memory 25 and outputs, to the OS 31, a command for instructing the MFP-A to execute printing. After outputting the command, the word processing program 35 outputs image data to the OS 31. The OS 31 refers to the registry and identifies a printer driver corresponding to the printer name "MFP-A" (i.e., the first printer driver 32A). Then, the OS 31 converts the image data output by the word processing program 35 to a format the first printer driver 32A can process, and outputs the converted document data to the first printer driver 32A. The first printer driver 32A obtains image data output by the word processing program 35 and converted by the OS 31.

Upon acquiring the image data output by the word processing program 35 via the OS 31, the first printer driver 32A determines whether the connection destination indicated by the connection destination setting data is Port 1 being the main port indicated by the connection destination candidate data (S301). S301 is an example of an eighth determination process.

Figure 8A:
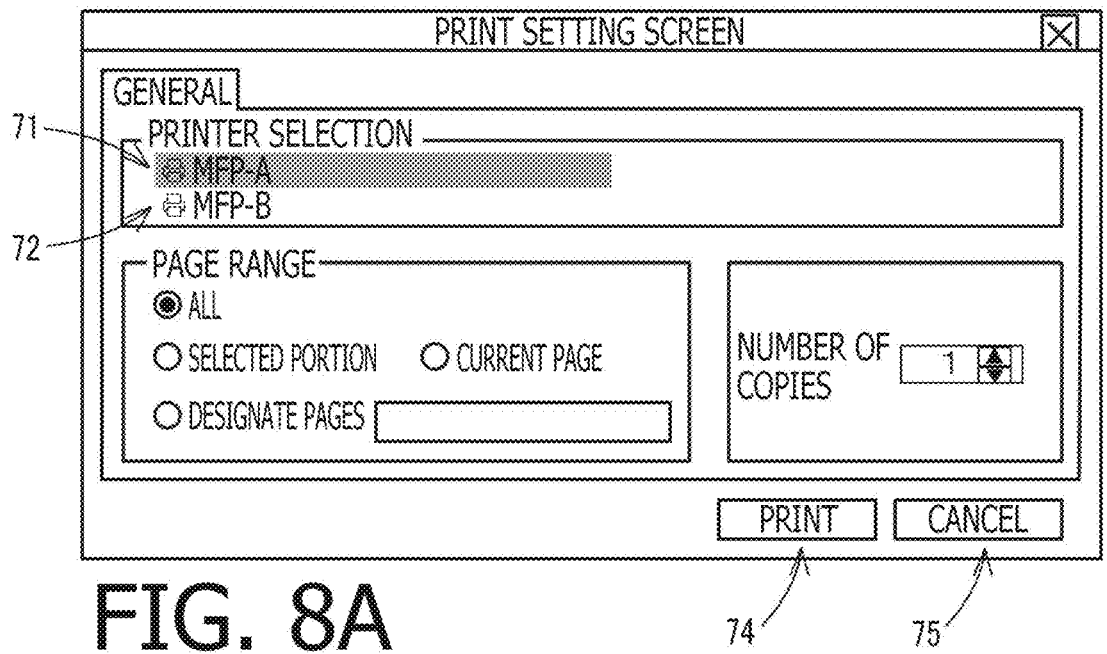
FIG. 8A is a diagram showing a first-printer-selected screen.

Upon determining that the connection destination of the first printer driver 32A indicated by the connection destination setting data is Port 1 (S301: Yes), the first printer driver 32A displays a first-printer-selected screen (see FIG. 8A) on the display 21 (S302). The first-printer-selected screen has an "MFP-A" object 71, an "MFP-B" object 72, a "print" icon 74 and a "cancel" icon 75 displayed thereon. S302 is an example of a first displaying process. The first-printer-selected screen is an example of a first screen.

The object 71 includes a display character string corresponding to the first printer driver 32A included in the connection destination setting data. In the example shown in the drawing, the object 71 includes "MFP-A" as the display character string. The object 72 includes the display character string corresponding to the second printer driver 32B included in the connection destination setting data. In the example shown in the drawing, the object 72 includes "MFP-B" as the display character string. The object 71 and the object 72 are examples of a first object.

The printer driver 32A monitors selection of an icon by the user (S303). Upon determining that the user has not yet selected an icon (S303: None), the first printer driver 32A continues executing S303. Upon determining that the user has selected an icon, the first printer driver 32A determines the icon selected by the user. Upon determining that the user has selected the "cancel" icon 75 (S303: Cancel), the first printer driver 32A does not transmit the printing instruction and terminates the printing process. Upon determining that the user has selected the "print" icon 74 (S303: Print), the first printer driver 32A transmits the printing instruction through the network I/F 23 to the MFP 50 corresponding to the printing port indicated in the connection destination setting data as the connection destination of the first printer driver 32A (S304), and terminates the printing process.

Upon determining in S301 that the connection destination of the first printer driver 32A indicated by the connection destination setting data is not Port 1 being the main port (S301: No), the printer driver 32A determines, based on the automatic connection setting data, whether the printing port being the connection destination of the first printer driver 32A indicated by the connection destination setting data is a connection destination which the automatic connection with the PC 10 is permitted. S305 is an example of a ninth determination process.

Figure 8B:
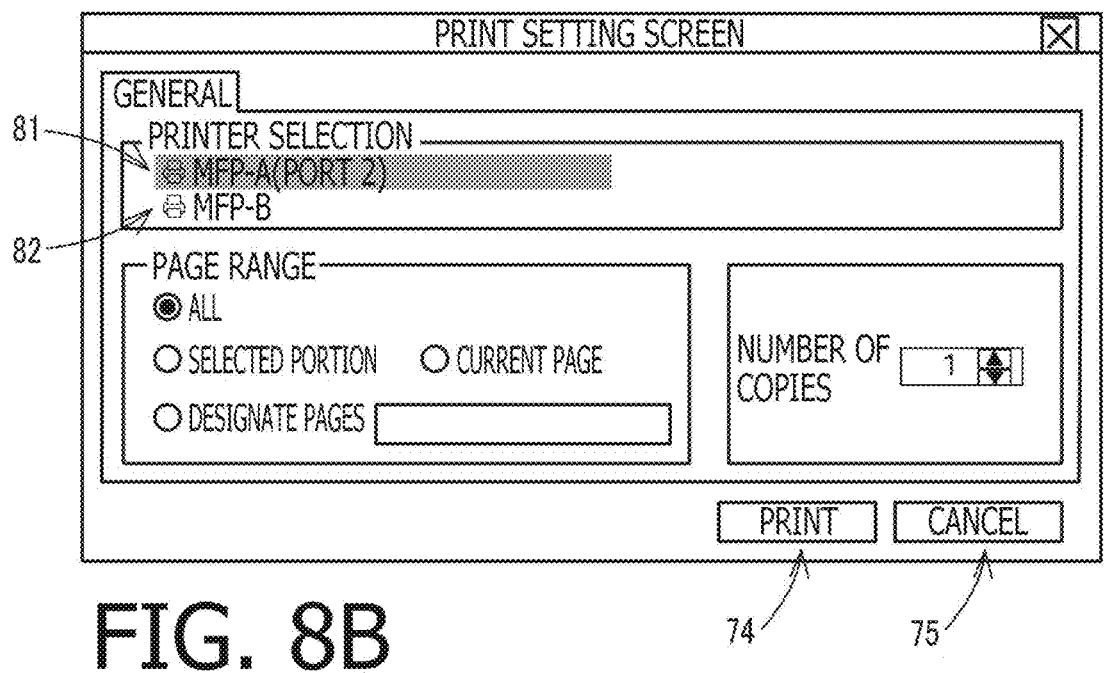
FIG. 8B is a diagram showing a second-printer-selected screen.

Upon determining that the connection destination of the first printer driver 32A indicated by the connection destination setting data is a connection destination which the automatic connection with the PC 10 is permitted (S305: Yes), the first printer driver 32A makes the display 21 display the second-printer-selected screen (See FIG. 8B.) (S306). The second-printer-selected screen has an "MFP-A (Port 2)" object 81, an "MFP-B" object 82, the "print" icon 74 and the "cancel" icon 75 displayed thereon. S306 is an example of a second displaying process. The second-printer-selected screen is an example of a second screen.

The object 81 includes the display character string corresponding to the first printer driver 32A included in the connection destination setting data. In the example shown in FIG. 8B, the object 81 includes "MFP-A (Port 2)" as the display character string. The display character string "MFP-A (Port 2)" included in the object 81 of the second-printer-selected screen is different from the display character string "MFP-A" included in the object 71 of the first-printer-selected screen. This is because the connection destination of the first printer driver 32A indicated by the connection destination setting data has been changed to the candidate port (Port 2) and the display character string corresponding to the first printer driver 32A has been changed to the character string corresponding to the candidate port (Port 2) in S210 of the aforementioned port monitoring process. The display character string included in the object 71 is an example of a first character string. The display character string included in the object 81 is an example of a second character string.

In S306, the first printer driver 32A displays the second-printer-selected screen on the display 21 while making a display mode of the object 81 different from a display mode of the object 71 in the first-printer-selected screen. In the example shown in FIG. 8B, the display character string included in the object 81 is displayed with fonts bolder than the display character string included in the object 71 of the first-printer-selected screen.

The object 82 includes a display character string corresponding to the second printer driver 32B included in the connection destination setting data. In the example shown in the drawing, the object 82 includes "MFP-B" as the display character string. The aforementioned object 81 and object 82 are examples of the first object.

Figure 9A:
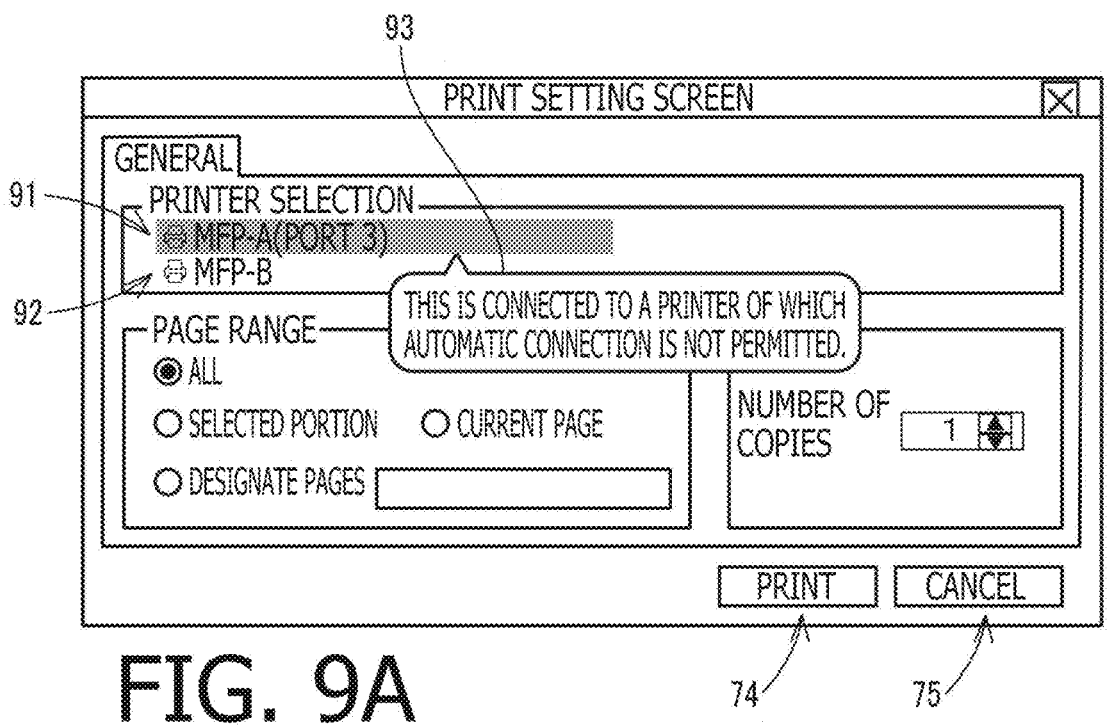
FIG. 9A is a diagram showing a third-printer-selected screen.

Upon determining in S305 that the connection destination of the first printer driver 32A indicated by the connection destination setting data is a connection destination which the automatic connection with the PC 10 is not permitted (S305: No), the first printer driver 32A displays a third-printer-selected screen (See FIG. 9A.) on the display 21 (S307). The third-printer-selected screen has an "MFP-A (Port 3)" object 91, an "MFP-B" object 92, the "print" icon 74 and the "cancel" icon 75 displayed thereon. S307 is an example of the second displaying process and a third displaying process. The third-printer-selected screen is an example of the second screen and a third screen.

The object 91 includes the display character string corresponding to the first printer driver 32A included in the connection destination setting data. In the example shown in FIG. 9A, the object 91 includes "MFP-A (Port 3)" as the display character string. The display character string "MFP-A (Port 3)" included in the object 91 of the third-printer-selected screen is different from the display character string "MFP-A" included in the object 71 of the first-printer-selected screen. This is because the connection destination of the first printer driver 32A indicated by the connection destination setting data has been changed to the candidate port (Port 3) and the display character string corresponding to the first printer driver 32A has been changed to the character string corresponding the candidate port (Port 3) in S210 of the aforementioned port monitoring process. The display character string included in the object 91 is an example of the second character string.

In S307, the first printer driver 32A displays the third-printer-selected screen on the display 21 while making a display mode of the object 91 different from the display mode of the object 71 in the first-printer-selected screen. In the example shown in FIG. 9A, the display character string included in the object 91 is displayed with fonts bolder than the display character string included in the object 71 of the first-printer-selected screen.

The object 92 includes the display character string for the second printer driver 32B included in the connection destination setting data. In the example shown in the drawing, the object 92 includes "MFP-B" as the display character string. The aforementioned object 91 and object 92 are examples of the first object.

In the example shown in the drawing, the object 93 includes a character string "This PC is connected to a printer of which automatic connection is not permitted." The object 93 is an object indicating that the printing port assigned to the printer driver 32A indicated by the connection destination setting data is not a printing port which the automatic connection with the PC 10 is permitted. The object 93 is an example of a second object.

Upon determining in S301 that the connection destination of the first printer driver 32A indicated by the connection destination setting data is not Port 1 (S301: No) and displaying the second-printer-selected screen or the third-printer-selected screen on the display (S306, S307), the first printer driver 32A obtains a distance between an object 83 (See FIG. 9B.), moving within the display screen of the display 21 in accordance with the operation input receiving through the input I/F 22, and the "print" icon 74 included in the second-printer-selected screen or the third-printer-selected screen (S308). The "print" icon 74 is an object for instructing the first printer driver 32A to transmit the printing instruction to the MFP 50. The "print" icon 74 is an example of a third object. The object 83 is an example of a pointer image. S308 is an example of a distance obtaining process.

The first printer driver 32A determines whether the obtained distance has become lower than a predetermined threshold value (S308). Upon determining that the obtained distance has not become lower than the predetermined threshold value (S308: No), the first printer driver 32A continues executing S308. Upon determining that the obtained distance has become lower than a predetermined threshold value (S308: Yes), the first printer driver 32A displays an object 84 (See FIG. 9B) on the display 21 (S309). S309 is an example of a fourth displaying process.

Figure 9B:
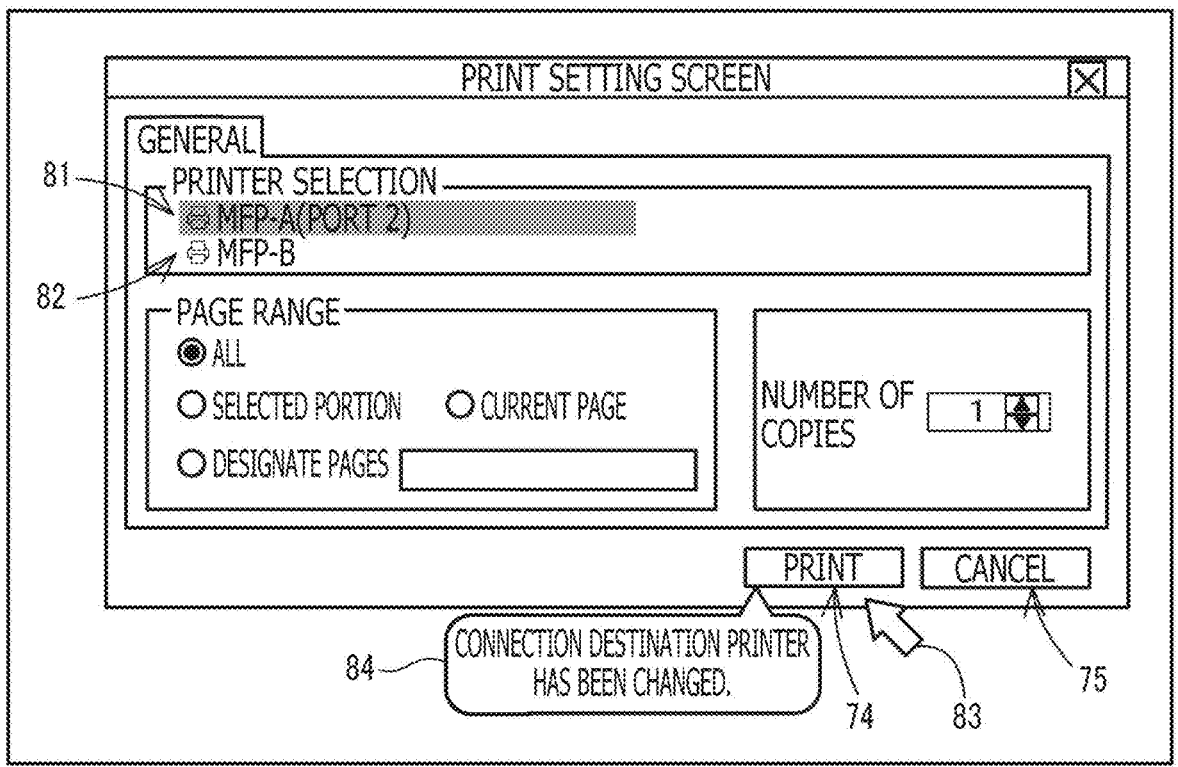
FIG. 9B is diagram showing a state of a display where the second-printer-selected screen and objects and are displayed.

In the example shown in FIG. 9B, the second-printer-selected screen, the object 83 and the object 84 are displayed on the display 21. The object 84 is an object indicating that the printing port assigned to the first printer driver 32A is not Port 1 being the main port. In the example shown, the object 84 includes a character string "The connection destination printer has been changed." The object 84 is an example of a fourth object.

The printer driver 32A monitors selection of an icon by the user (S310). Upon determining that the user has not yet selected an icon (S310: None), the first printer driver 32A continues the processes of S308 to S310. Upon determining that the user has selected an icon, the first printer driver 32A determines the icon selected by the user. Upon determining that the user has selected the "cancel" icon 75 (S310: Cancel), the first printer driver 32A does not transmit the printing instruction and terminates the printing process. Upon determining that the user has selected the "print" icon 74 (S310: Print), the first printer driver 32A transmits the printing instruction through the network I/F 23 to the MFP 50 corresponding to the printing port indicated in the connection destination setting data (S311) as the connection destination of the first printer driver 32A, and terminates the printing process.

In the present embodiment, if the MFP 50A corresponding to Port 1 being the main port is offline, the status monitor 34 changes the printing port assigned to the first printer driver 32A to the printing port which the MFP 50 corresponding thereto is online (in the above example, Port 2). Port 2 corresponds to the MFP 50B whose model name is MFP-A and supported by the first printer driver 32A. Therefore, even if the MFP 50A corresponding to Port 1 being the main port becomes offline, the user can execute printing with the MFP 50B corresponding to Port 2. As a result, the occurrence of a situation where the MFP 50 corresponding to a particular connection destination is offline and printing is not performed can be suppressed by switching the connection destination to another one to which an online MFP 50 corresponds.

In the present embodiment, the user who is setting the first printer driver 32A as a "printer driver to be generally used" by the OS 31 can execute printing by using the "printer driver to be generally used" without any operation for changing the settings of the "printer driver to be generally used" even if the first MFP 50 becomes offline. Accordingly, the present embodiment makes printing less troublesome for the user.

In the present embodiment, the "printer driver to be generally used" does not change even if the MFP 50 that actually executes printing is changed from the one at the time of installation. Accordingly, the present embodiment can eliminate the possibility that the user becomes anxious by the change in the "printer driver to be usually used."

In the present embodiment, when the MFP 50A corresponding to Port 1 is online, the status monitor 34 sets Port 1 as the printing port assigned to the first printer driver 32A. Therefore, the connection destination of the first printer driver 32A is Port 1 whenever the MFP 50A corresponding to Port 1 being the main port is online. As the result, the user can execute printing using the MFP 50A whenever the MFP 50A corresponding to Port 1 being the main port is online.

In the present embodiment, when the MFP 50A and the MFP 50B respectively corresponding to Port 1 and Port 2 are offline, the status monitor changes the printing port assigned to the first printer driver 32A to Port 3 which the MFP 50C corresponding thereto is online. Port 3 corresponds to the MFP 50C whose model name is MFP-A and is supported by the first printer driver 32A. Therefore, even if the MFP 50B corresponding to Port 2 being the current connection destination becomes offline and the MFP 50A corresponding to Port 1 is offline, the user can execute printing with the MFP 50C corresponding to Port 3. As a result, the occurrence of the situation where the MFP 50 corresponding to a particular connection destination is offline and printing is not performed can be suppressed by switching the connection destination to another one to which an online MFP 50 corresponds.

In the present embodiment, the status monitor 34 executes the port monitoring process for each of the printer drivers 32 being set as the monitoring targets. For example, the status monitor 34 executes the port monitoring process for the first printer driver 32A and the second printer driver 32B. Therefore, the occurrence of the situation where the MFP 50 corresponding to a particular connection destination is offline and printing is not performed can be suppressed for each of a plurality of printer drivers 32.

In the present embodiment, the status monitor 34 changes the printing port assigned to the printer driver 32 to the candidate port being determined to be in the printable state. Therefore, the occurrence of a situation where the connection destination of the printer driver 32 is changed to the printing port which is not in the printable state can be suppressed. As the result, the occurrence of a situation where printing under control of the PC 10 cannot be executed can be suppressed.

In the present embodiment, the status monitor 34 changes the printing port assigned to the printer driver 32 to the printing port which the automatic connection is permitted. Therefore, the printing port to be assigned to the printer driver 32 can be managed using the automatic connection setting.

In the present embodiment, the installer 33 receives, in the install process, the operation inputs by the user designating whether to set the printing ports as the connection destinations which the automatic connection is permitted, and generates the automatic connection setting data based on the operation inputs. Therefore, whether to permit the automatic connection with the PC 10 can be set at the time of the installation of the printer driver 32.

In the present embodiment, in the case where the candidate port is not the connection destination which the automatic connection is permitted, the status monitor 34 connects the PC 10 to the candidate port when the operation input indicating the user's acceptance is received. Therefore, the PC 10 can be connected to the printing port which, according to the setting, the automatic connection is not permitted by performing the operation input indicating the user's acceptance. As the result, the occurrence of the situation where printing under control of the PC 10 cannot be executed can further be suppressed.

In the present embodiment, the status monitor 34 changes the printing port assigned to the printer driver 32 to the printing port having the highest priority order. Therefore, the printing port to be assigned to the printer driver 32 can be managed using the priority order setting.

In the present embodiment, the installer 33 receives, in the install process, the operation input by the user designating the priority orders of the printing ports and generates the priority order setting data based on the operation input. Therefore, the priority orders of the printing ports can be set at the time of the installation of the printer driver 32.

In the present embodiment, when the priority order is not set to the candidate port, the status monitor 34 connects the PC 10 to the candidate port when the operation input indicating the user's acceptance is received. Therefore, the PC 10 can be connected to the printing port which the priority order is not set by performing the operation input indicating the user's acceptance. As the result, the occurrence of the situation where printing under control of the PC 10 cannot be executed can further be suppressed.

In the present embodiment, the display mode of the object 81 in the second-printer-selected screen displayed when the connection destination of the first printer driver 32A is not Port 1 is different from the display mode of the object 71 in the first-printer-selected screen displayed when the connection destination of the first printer driver 32A is Port 1. Therefore, the user can easily recognize that the connection destination of the first printer driver 32A is not Port 1, that is, that the MFP 50 which will execute printing is different from the MFP 50A which was the printer that would have executed printing at the time of the installation of the first printer driver 32A.

In the present embodiment, the display character string corresponding to the first printer driver 32A differs between the first-printer-selected screen and the second-printer-selected screen and between the first-printer-selected screen and the third-printer-selected screen. Therefore, the user can easily recognize that the connection destination of the first printer driver 32A is not Port 1, that is, that the MFP 50 which will execute printing is different from the MFP 50A which was the printer that would have executed printing at the time of the installation of the first printer driver 32A.

In the present embodiment, when the connection destination of the first printer driver 32A is not the printing port which the automatic connection is permitted, the third-printer-selected screen including the object 93 indicating that the first printer driver 32A is connected to a printing port which the automatic connection is not permitted is displayed. Therefore, the user can easily recognize that the connection destination of the first printer driver 32A is not the printing port which the automatic connection is permitted.

In the present embodiment, when the connection destination of the first printer driver 32A is not Port 1, the object 84 indicating that the connection destination of the first printer driver 32A is not Port 1 is displayed as the object 83 approaches the icon 74 for instructing printing. Therefore, the user can easily recognize that the connection destination of the first printer driver 32A is not Port 1, that is, that the MFP 50 which will execute printing is different from the MFP 50A which was the printer that would have executed printing at the time of the installation of the first printer driver 32A.

<Variation>

In the above-described embodiment, in response to determining that the candidate port is not a connection destination which the automatic connection is permitted or that the priority order is not set to the candidate port (S208: No), the status monitor 34 receives, through the input I/F 22, an operation input by the user designating whether to accept connection of the PC 10 to the candidate port (S209). In contrast, in this variation, in place of determining whether the priority order is set or not, whether the priority order is equal to or greater than a threshold value or not is determined. Configurations and processes of the variation, other than those described below, are the same as those in the above-described embodiment.

Upon determining that the MFP 50 corresponding to the candidate port is in the printable state (S207: Yes), the status monitor 34 determines whether the candidate port is a connection destination which the automatic connection with the PC 10 is permitted, and determines whether the priority order of the candidate port indicated by the priority order setting data is equal to or greater than a predetermined threshold value (S208). S208 is an example of the fifth determination process and a seventh determination process.

In response to determining that the candidate port is not a connection destination which the automatic connection is permitted or that the priority order of the candidate port is lower than the predetermined threshold value (S208: No), the status monitor 34 receives, through the input I/F 22, an operation input by the user designating whether to accept connection of the PC 10 to the candidate port (S209). S209 is an example of the third reception process and a sixth reception process.

In this variation, when the priority order set to the candidate port is lower than the threshold value, the status monitor 34 connects the PC 10 to the candidate port when the operation input indicating the user's acceptance is received. Therefore, the PC 10 can be connected to the printing port which the priority order is lower than the threshold value by performing the operation input indicating the user's acceptance. As the result, the occurrence of the situation where printing under control of the PC 10 cannot be executed can further be suppressed.

<Other Variations>

In the above-described embodiment, the system 100 includes the PC 10 and the MFPs 50, and the status monitor 34 changes the printing port assigned to the first printer driver 32A to the printing port corresponding to the MFP 50 being online. Then, the first printer driver 32A transmits the printing instruction to the MFP 50 corresponding to the printing port being changed to be the connection destination of the first printer driver 32A. However, the system 100 may include, in place of the MFP 50, a single-function machine functioning only as a scanner. The status monitor 34 may be configured to change a port assigned to a scanner driver to a port corresponding to the single-function machine being online. The scanner driver transmits a scanning instruction instructing the single-function machine corresponding to the port being changed to be the connection destination of the scanner driver to generate scan data. The single-function machine is an example of the image forming device. The scanner driver is an example of the device driver. The scanning instruction is an example of an image forming instruction.

In the above-described embodiment, the printing ports are divided into two category, namely, the main port and the sub port, and the priority orders are assigned to the sub ports. However, the printing port need not be divided into the main port and the sub port. In this case, the highest priority order may be assigned to the printing port which was categorized as the main port in the above-described embodiment.

What is claimed is:

1. A non-transitory computer-readable recording medium storing computer-readable instructions for an information processing device comprising a network interface, a memory and a processor, the memory storing connection destination setting data and connection destination candidate data, the connection destination setting data initially indicating a first connection destination corresponding to a first first-type device connected to the information processing device via a network as a set connection destination of a first device instruction program which supports first-type devices, and the connection destination candidate data indicating multiple connection destinations respectively corresponding to multiple first-type devices connected to the information processing device via a network, the computer-readable instructions causing, when executed by the processor of the information processing device, the information processing device to perform:
 a first obtaining process of obtaining, from the memory, the connection destination setting data, the first device instruction program being configured to transmit, through the network interface, an instruction to a first-type device through the set connection destination indicated in the connection destination setting data;
 a first determination process of determining whether the first first-type device corresponding to the first connection destination is online or offline with the network;
 a first identification process of identifying, in response to determining in the first determination process that the first first-type device is offline with the network, among the multiple connection destinations indicated by the connection destination candidate data, a second connection destination that is different from the first connection destination and corresponding to a second first-type device which is online with the network; and
 a first update process of updating the connection destination setting data to indicate the second connection destination identified by the first identification process as the set connection destination.

2. The non-transitory computer-readable recording medium of claim 1,
 wherein the computer-readable instructions cause, when executed by the processor of the information processing device, the information processing device to perform:
 a second determination process of determining, after the first update process, whether the first first-type device has become online; and
 a second update process of, in response to determining in the second determination process that the first first-type device has become online, updating the connection destination setting data to indicate the first connection destination as the set connection destination.

3. The non-transitory computer-readable recording medium of claim 2,
 wherein the computer-readable instructions cause, when executed by the processor of the information processing device, the information processing device to perform:
 a third determination process of determining, after the first update process, whether the second first-type device is online or offline;
 a second identification process of, in response to determining in the second determination process that the first first-type device has not become online and in the third determination process that the second first-type device is offline, identifying, among the multiple connection destinations indicated by the connection destination candidate data, a third connection destination that is different from the first connection destination and the second connection destination and corresponding to a third first-type device which is online with the network; and
 a third update process of updating the connection destination setting data to indicate the third connection destination identified by the second identification process as the set connection destination.

4. The non-transitory computer-readable recording medium of claim 1,
 wherein the computer-readable instructions cause, when executed by the processor of the information processing device, the information processing device to perform:
 the first obtaining process, the first determination process, the first identification process and the first update process for every monitoring target device instruction program based on information, indicated by monitoring target data stored in the memory, indicating whether to make each of a plurality of device instruction programs a monitoring target device instruction program.

5. The non-transitory computer-readable recording medium of claim 1,
 wherein, in the first determination process,
 a response request is transmitted to the first first-type device through the network interface,
 it is determined that the first first-type device is online if a response is received from the first first-type device in response to the response request through the network interface within a predetermined time period, and
 it is determined that the first first-type device connected to the first connection destination is offline if a response is not received from the first first-type device in response to the response request through the network interface within a predetermined time period.

6. The non-transitory computer-readable recording medium of claim 1,
 wherein the computer-readable instructions cause, when executed by the processor of the information processing device, the information processing device to perform an installation process of installing the first device instruction program to the information processing device,
 wherein, in the installation process, the information processing device is caused to perform processes including:
 a first reception process of receiving input, through a user interface included in input interfaces connected to the processor, designating one first-type device, connected to the information processing device via the network and being online with the network, to be set as the first first-type device;
 a first request process of requesting, to the OS of the information processing device, generation of a first port corresponding to the first-type device designated by the first reception process;

a fourth update process of updating the connection destination setting data to indicate the first port generated in response to the first request process as the first connection destination;

a second request process of identifying one first-type device connected to the information processing device via the network and being online with the network and that is different from the device designated by the first reception process, and requesting, to the OS of the information processing device, generation of a second port corresponding to the identified first-type device; and a fifth update process of updating the connection destination candidate data to indicate the second port as the second connection destination.

7. The non-transitory computer-readable recording medium of claim 1, wherein the computer-readable instructions includes a first instruction and a second instruction, wherein the first instruction causes, when executed by the processor of the information processing device, the information processing device to perform the installation process, the installation process further including installing the second instruction to the information processing device, wherein the second instruction causes, when executed by the processor of the information processing device, the information processing device to perform the first obtaining process, the first determination process, the first identification process and the first update process for every monitoring target device instruction program based on information indicated by monitoring target data, stored in the memory, indicating whether to make each of a plurality of device instruction programs a monitoring target device instruction program, wherein, in the installation process, the information processing device is caused to perform a sixth update process of updating the monitoring target data such that the first device instruction program becomes the monitoring target.

8. The non-transitory computer-readable recording medium of claim 1, wherein the computer-readable instructions cause, when executed by the processor of the information processing device, the information processing device to perform a fourth determination process of determining whether the second first-type device is in a state in which an operation in accordance with the instruction which the first device instruction program transmits can be executed, and wherein, in the first update process, the connection destination setting data is updated in response to determining in the fourth determination process that the second first-type device is in the state in which the operation in accordance with the instruction which the first device instruction program transmits can be executed.

9. The non-transitory computer-readable recording medium of claim 1, wherein the computer-readable instructions cause, when executed by the processor of the information processing device, the information processing device to perform a fifth determination process of determining, based on information indicated by an automatic connection setting data stored in the memory, whether the second connection destination is a connection destination which automatic connection with the information processing device is permitted, and wherein, in the first update process, the connection destination setting data is updated in response to determining in the fifth determination process that the second connection destination is the connection destination which automatic connection with the information processing device is permitted.

10. The non-transitory computer-readable recording medium of claim 9, wherein the computer-readable instructions cause, when executed by the processor of the information processing device, the information processing device to perform an installation process of installing the first device instruction program to the information processing device, wherein, in the installation process, the information processing device is caused to perform processes including:

a first reception process of receiving input, through a user interface included in input interfaces connected to the processor, designating one first-type device, connected to the information processing device via the network and being online with the network, to be set as the first first-type device;

a first request process of requesting, to the OS of the information processing device, generation of a first port corresponding to the first-type device designated by the first reception process;

a fourth update process of updating the connection destination setting data to indicate the port generated in response to the first request process as the first connection destination;

a second request process of identifying one first-type device connected to the information processing device via the network and being online with the network and that is different from the first-type device designated by the first reception process, and requesting, to the OS of the information processing device, generation of a second port corresponding to the identified first-type device;

a fifth update process of updating the connection destination candidate data to indicate the second port as the second connection destination;

a second reception process of receiving input, through the user interface included in the input interfaces connected to the processor, designating whether to permit automatic connection of the second port with the information processing device; and a first generation process of generating the automatic connection setting data based on the input in the second reception process and stores the automatic connection setting data in the memory.

11. The non-transitory computer-readable recording medium of claim 9, wherein the computer-readable instructions cause, when executed by the processor of the information processing device, the information processing device to perform a third reception process of receiving input, through a user interface included in input interfaces connected to the processor, designating whether to accept connection of the information processing device to the second connection destination in response to determining in the fifth determination process that the second connection destination is not a connection destination which automatic connection with the information processing device is permitted, and
wherein, in the first update process, the connection destination setting data is updated in response to receiving, in the third reception process, acceptance of connection of the information processing device to the second connection destination.

12. The non-transitory computer-readable recording medium of claim 1,
wherein the memory further stores priority order setting data indicating priority orders, for a connection with the information processing device, of the multiple connection destinations,
wherein, in the first update process, the connection destination setting data is updated to indicate a connection destination having the highest priority order indicated by priority order setting data as the set connection destination.

13. The non-transitory computer-readable recording medium of claim 12,
wherein the computer-readable instructions cause, when executed by the processor of the information processing device, the information processing device to perform an installation process of installing the first device instruction program to the information processing device,
wherein, in the installation process, the information processing device is caused to perform processes including:
  a first reception process of receiving input, through a user interface included in input interfaces connected to the processor, designating one first-type device, connected to the information processing device via the network and being online with the network, to be set as the first first-type device;
  a first request process of requesting, to the OS of the information processing device, generation of a first port corresponding to the first-type device designated by the first reception process;
  a fourth update process of updating the connection destination setting data to indicate the first port generated in response to the first request process as the first connection destination;
  a second request process of identifying one device connected to the information processing device via the network and being online with the network and that is different from the first-type device designated by the first reception process, and of requesting, to the OS of the information processing device, generation of a second port corresponding to the identified first-type device;
  a fifth update process of updating the connection destination candidate data to indicate the second port as the second connection destination;
  a fourth reception process of receiving input, through a user interface included in input interfaces connected to the processor, designating a priority order of the second port; and
  a second generation process of generating the priority order setting data based on the input in the fourth reception process and stores the priority order setting data in the memory.

14. The non-transitory computer-readable recording medium of claim 12,
wherein the computer-readable instructions cause, when executed by the processor of the information processing device, the information processing device to perform:
  a sixth determination process of determining whether the priority order of the second connection destination is set in the priority order setting data; and
  a fifth reception process of receiving input, through a user interface included in input interfaces connected to the processor, designating whether to accept connection of the information processing device to the second connection destination in response to determining in the sixth determination process that the priority order of the second connection destination is not set,
wherein, in the first update process, the connection destination setting data is updated in response to receiving, in the fifth reception process, acceptance of connection of the information processing device to the second connection destination.

15. The non-transitory computer-readable recording medium of claim 12,
wherein the computer-readable instructions cause, when executed by the processor of the information processing device, the information processing device to perform:
  a seventh determination process of determining whether the priority order set to the second destination is equal to or higher than a predetermined threshold value; and
  a sixth reception process of receiving input, through a user interface included in input interfaces connected to the processor, designating whether to accept connection of the information processing device to the second connection destination in response to determining in the seventh determination that the priority order set to the second destination is less than the predetermined threshold value,
wherein, in the first update process, the connection destination setting data is updated in response to receiving, in the sixth reception process, acceptance of connection of the information processing device to the second connection destination.

16. The non-transitory computer-readable recording medium of claim 1,
wherein the computer-readable instructions cause, when executed by the processor of the information processing device, the information processing device to perform:
  an eighth determination process of determining, in response to receiving input, through a user interface included in input interfaces connected to the processor, designating to make the first device instruction program to perform the instruction, whether the set connection destination of the first device instruction program is the first connection destination;
  a first displaying process of displaying, on a display connected to the processor of the information processing device, a first screen including a first object corresponding to the first device instruction program in response to determining in the eighth determination process that the set connection destination of the first device instruction program is the first connection destination; and
  a second displaying process of displaying, on the display, a second screen including the first object in response to determining in the eighth determination process that the set connection destination of the first device instruction program is not the first connection destination, wherein a displaying mode of the first object included in the second screen is different from a displaying mode of the first object included in the first screen.

17. The non-transitory computer-readable recording medium of claim 16,
wherein, in the first update process, a display character string corresponding to the first device instruction program included in the connection destination setting data is changed from a first character string to a second character string different from the first character string,
wherein the first object included in the first display screen includes the first character string, and
wherein the first object included in the second display screen includes the second character string.

18. The non-transitory computer-readable recording medium of claim 16,
wherein the computer-readable instructions cause, when executed by the processor of the information processing device, the information processing device to perform, in response to determining in the eighth determination process that the set connection destination of the first device instruction program is not the first connection destination, a ninth determination process of determining, based on information indicated by an automatic connection setting data stored in the memory, whether the set connection destination of the first device instruction program is a connection destination which automatic connection with the information processing device is permitted,
wherein, in the second displaying process, the second screen is displayed in response to determining in the ninth determination process that the set connection destination of the first device instruction program is a connection destination which automatic connection with the information processing device is permitted,
wherein the computer-readable instructions cause, when executed by the processor of the information processing device, the information processing device to further perform a third displaying process of displaying, on the display, a third screen including the first object and a second object in response to determining in the ninth determination process that the set connection destination of the first device instruction program is a connection destination which automatic connection with the information processing device is not permitted,
wherein a displaying mode of the first object included in the third screen is different from the displaying mode of the first object included in the first screen, and
wherein the second object is an object indicating that the set connection destination of the first device instruction program is a connection destination which automatic connection with the information processing device is not permitted.

19. The non-transitory computer-readable recording medium of claim 16,
wherein the computer-readable instructions cause, when executed by the processor of the information processing device, the information processing device to perform, in response to determining in the ninth determination process that the set connection destination of the first device instruction program is not a connection destination which automatic connection with the information processing device is permitted, a distance obtaining process of obtaining a distance between a pointer image moving in a display screen of the display in accordance with an input receiving through the user interface and a third object included in the second display screen, wherein the third object is an object indicating an instruction to the first device instruction program to transmit the instruction to the device, wherein the computer-readable instructions cause, when executed by the processor of the information processing device, the information processing device to further perform, in response to the distance obtained in the distance obtaining process falling below a predetermined threshold value, a fourth displaying process that displays, on the display, a fourth object indicating that the set connection destination of the first device instruction program is not the first connection destination.

20. The non-transitory computer-readable recording medium of claim 1,
wherein the first-type devices are image forming devices, and
wherein the instruction which the first device instruction program transmits is an image forming instruction.

21. The non-transitory computer-readable recording medium of claim 20,
wherein the image forming devices are printers, and
wherein the image forming instruction is an instruction to execute printing.

22. The non-transitory computer-readable recording medium of claim 1,
wherein the first device instruction program is a device driver.

23. The non-transitory computer-readable recording medium of claim 22,
wherein the first-type devices are printers,
wherein the device driver is a printer driver that operates on a printing system an OS of the information processing device has, and the set connection destination the connection destination setting data indicates is a printing port, and
wherein, in the first update process, the connection destination setting data, being a registry indicating the printing port the OS has provided for use with the printing system and being assigned to the device driver, is updated to indicate the second connection destination as the set connection destination.

24. An information processing device comprising:
a memory;
a network interface; and
a controller,
wherein the memory stores connection destination setting data initially indicating a first connection destination corresponding to a first first-type device connected to the information processing device via a network as a set connection destination of a first device instruction program which supports first-type devices, and
wherein the controller is configured to:
obtain, from the memory, the connection destination setting data, the first device instruction program being configured to transmit, through the network interface, an instruction to a first-type device through the set connection destination indicated in the connection destination setting data;
determine whether the first first-type device corresponding to the first connection destination is online or offline with the network;
identify, in response to determining that the first first-type device is offline with the network, a second connection destination that is different from the first connection destination and corresponding to a second first-type device connected to the information processing device via the network and being online with the network; and update the connection destination setting data to indicate the second connection destination as the set connection destination.

25. A system including an information processing device and multiple devices connected to the information processing device via a network, the devices respectively corresponding to multiple connection destinations prepared in the information processing device, the information processing device including a memory and a network interface, the memory storing connection destination setting data initially indicating a first connection destination corresponding to a first first-type device as a set connection destination of a first device instruction program which supports first-type devices, and a controller, wherein the controller is configured to:

obtain, from the memory, the connection destination setting data, the first device instruction program being configured to transmit, through the network interface, an instruction to a first-type device through the set connection destination indicated in the connection destination setting data;

determine whether the first first-type device corresponding to the first connection destination is online or offline with the network;

identify, in response to determining that the first first-type device is offline, a second connection destination that is different from the first connection destination and corresponding to a second first-type device which is online with the network; and update the connection destination setting data to indicate the second connection destination as the set connection destination.

\* \* \* \* \*